US012079023B2

(12) United States Patent
Park et al.

(10) Patent No.: US 12,079,023 B2
(45) Date of Patent: Sep. 3, 2024

(54) ELECTRONIC DEVICE

(71) Applicant: SAMSUNG ELECTRONICS CO., LTD., Suwon-si (KR)

(72) Inventors: Jeongpyo Park, Seoul (KR); Tae-Hwang Kong, Suwon-si (KR); Junhyeok Yang, Seoul (KR); Jooseong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/374,028

(22) Filed: Sep. 28, 2023

(65) Prior Publication Data

US 2024/0019886 A1 Jan. 18, 2024

Related U.S. Application Data

(63) Continuation of application No. 17/385,010, filed on Jul. 26, 2021, now Pat. No. 11,797,040.

(30) Foreign Application Priority Data

Nov. 30, 2020 (KR) ........................ 10-2020-0163920

(51) Int. Cl.
*G05F 3/26* (2006.01)
*G05F 1/46* (2006.01)

(52) U.S. Cl.
CPC .............. *G05F 3/267* (2013.01); *G05F 1/461* (2013.01); *G05F 1/468* (2013.01)

(58) Field of Classification Search
CPC ........... G05F 1/461; G05F 1/468; G05F 3/267
See application file for complete search history.

(56) References Cited

U.S. PATENT DOCUMENTS 7,535,285 B2 5/2009 Colman
7,609,045 B2 10/2009 Wang
(Continued)

FOREIGN PATENT DOCUMENTS

KR 10-1000858 12/2010
KR 10-2085724 3/2020

OTHER PUBLICATIONS

Bill Ma et al., "A Novel 1.2-V 4.5-ppm/° C Curvature-Compensated CMOS Bandgap Reference", IEEE Transactions on Circuits and Systems—I: Regular Papers, vol. 61, No. 4, Apr. 2014, pp. 1026-1035.
(Continued)

*Primary Examiner* — Jue Zhang
*Assistant Examiner* — Lakaisha Jackson
(74) *Attorney, Agent, or Firm* — F. CHAU & ASSOCIATES, LLC

(57) ABSTRACT

An electronic device including: a reference voltage generator circuit to generate a reference voltage based on a first and second voltage, the reference voltage generator circuit including: a first current source to supply a first current to each of a first and second node; an amplifier to amplify a difference between the first voltage of the first node and the second voltage of the second node and to output a difference voltage corresponding to the amplified difference; a first bipolar junction transistor (BJT) connected to the first node; a first resistor connected to the second node; a second BJT connected between the first resistor and ground; a second resistor connected between the second node and ground; and a first transistor to be supplied with a second current from the first current source; and an adaptive cascode circuit to generate a bias voltage applied to a gate of the first transistor.

20 Claims, 9 Drawing Sheets

(56) References Cited

U.S. PATENT DOCUMENTS

| | | | | |
|---|---|---|---|---|
| 7,683,701 | B2 | 3/2010 | Georgescu et al. | |
| 7,944,283 | B2 | 5/2011 | Kim et al. | |
| 8,791,685 | B2 | 7/2014 | Cho et al. | |
| 10,061,340 | B1 * | 8/2018 | Rao | G05F 3/267 |
| 2008/0284501 | A1 | 11/2008 | Kim | |
| 2016/0091916 | A1 * | 3/2016 | Chang | G05F 3/262<br>323/268 |
| 2022/0171420 | A1 | 6/2022 | Park et al. | |

OTHER PUBLICATIONS

Hironori Banba et al., A CMOS Bandgap Reference Circuit With Sub-1-V operation, IEEE Journal of Solid-State Circuits, vol. 34, No. 5, May 1999, pp. 670-674.

* cited by examiner

ELECTRONIC DEVICE

CROSS-REFERENCE TO RELATED APPLICATIONS

This application is a continuation of U.S. patent application Ser. No. 17/385,010 filed on Jul. 26, 2021, which claims priority under 35 U.S.C. § 119 to Korean Patent Application No. 10-2020-0163920 filed on Nov. 30, 2020, in the Korean Intellectual Property Office, the disclosures of which are incorporated by reference herein in their entireties.

TECHNICAL FIELD

Embodiments of the present disclosure described herein relate to an electronic device, and more particularly, to an electronic device compensating for a process, voltage and temperature (PVT) variation of a reference voltage generator circuit included therein.

DISCUSSION OF RELATED ART

A reference voltage generator circuit may generate a uniform reference voltage. For example, the reference voltage generator circuit may produce a constant voltage independent of a power supply voltage. As the accuracy of the reference voltage increases, the performance of other components in an electronic device may be improved. An example of the reference voltage generator circuit is a bandgap reference circuit. The bandgap reference circuit may be a voltage-mode bandgap reference circuit or a current-mode bandgap reference circuit. A power supply voltage of an electronic device may decrease to reduce power consumption of the electronic device. In this case, a current-mode bandgap reference circuit may be used as a reference voltage generator circuit.

Elements included in the reference voltage generator circuit may have a characteristic in that they are inversely proportional or proportional to a temperature. For example, a turn-on voltage of transistors included in the reference voltage generator circuit may vary depending on an ambient temperature. As the turn-on voltage of the transistors varies, a mismatch may occur between currents generated within the reference voltage generator circuit, thereby decreasing the accuracy of the reference voltage. As such, an abnormal operation of the electronic device may occur.

SUMMARY

Embodiments of the present disclosure provide an electronic device including a reference voltage generator circuit capable of guaranteeing the accuracy of a reference voltage even in the event of a process or temperature change.

According to an embodiment of the present disclosure, there is provided an electronic device including: a reference voltage generator circuit configured to generate a reference voltage based on a first voltage and a second voltage, the reference voltage generator circuit including: a first current source configured to supply a first current to each of a first node and a second node; an amplifier configured to amplify a difference between the first voltage of the first node and the second voltage of the second node and to output a difference voltage corresponding to the amplified difference; a first bipolar junction transistor (BJT) connected to the first node; a first resistor connected to the second node; a second BJT connected between the first resistor and a ground terminal; a second resistor connected between the second node and the ground terminal; and a first transistor configured to be supplied with a second current from the first current source; and an adaptive cascode circuit configured to generate a bias voltage to be applied to a gate of the first transistor.

According to an embodiment of the present disclosure, there is provided an electronic device including: a reference voltage generator circuit configured to generate a reference voltage based on a first voltage and a second voltage, the reference voltage generator circuit including: a first current source configured to supply a first current to each of a first node and a second node; an amplifier configured to amplify a difference between the first voltage of the first node and the second voltage of the second node; and a first transistor supplied with a second current from the first current source; and an adaptive cascode circuit configured to generate a bias voltage to be applied to a gate of the first transistor; and a start-up circuit configured to supply, to the adaptive cascode circuit, a start-up voltage for adjusting a magnitude of the bias voltage, wherein the first voltage, the second voltage, and a voltage of a first terminal of the first transistor, which is connected to the first current source, are the same.

According to an embodiment of the present disclosure, there is provided an electronic device including: a reference voltage generator circuit including a first current source configured to supply a first current to each of a first node and a second node and to supply a second current to a third node, and a first transistor including a second terminal connected to an output node of the reference voltage generator circuit, from which a reference voltage is output, and a first terminal to which the second current is supplied, and configured to generate the reference voltage according to the second current and a difference between a first voltage of the first node and a second voltage of the second node; an adaptive cascode circuit including a second transistor including a first terminal connected to a gate of the first transistor and a second terminal connected to a ground terminal; and a start-up circuit configured to supply a start-up voltage to a gate of the second transistor, wherein the first voltage, the second voltage, and a voltage of the first terminal of the first transistor are the same.

BRIEF DESCRIPTION OF THE FIGURES

The above and other features of the present disclosure will become more apparent by describing in detail embodiments thereof with reference to the accompanying drawings.

DETAILED DESCRIPTION OF THE EMBODIMENTS

Hereinafter, embodiments of the present disclosure will be described in detail with reference to the accompanying drawings. In describing the present disclosure, similar components/elements may be marked by similar reference signs/numerals in drawings, and thus, additional description may be omitted.

Figure 1:
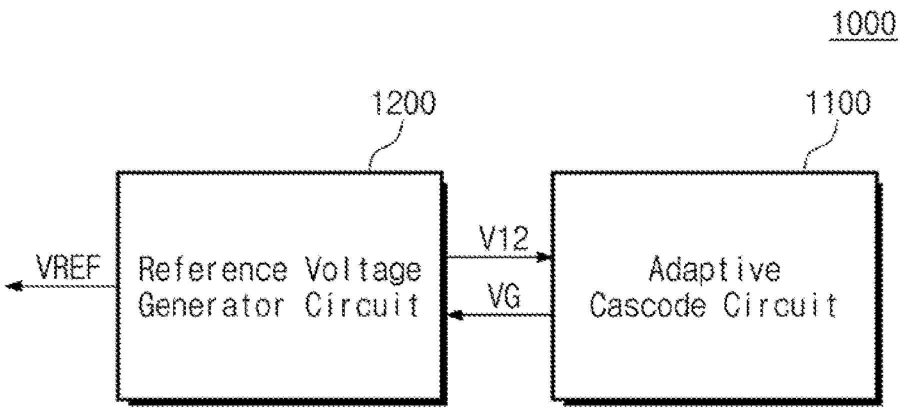
FIG. 1 illustrates a block diagram of an electronic device according to an embodiment of the present disclosure.

FIG. 1 illustrates a block diagram of an electronic device 1000 according to an embodiment of the present disclosure. Referring to FIG. 1, the electronic device 1000 may include an adaptive cascode circuit 1100 and a reference voltage generator circuit 1200.

The adaptive cascode circuit 1100 may provide a bias voltage VG to the reference voltage generator circuit 1200. The adaptive cascode circuit 1100 may generate the bias voltage VG by using a voltage V12 generated by the reference voltage generator circuit 1200. In an embodiment of the present disclosure, the adaptive cascode circuit 1100 may compensate for a change of an internal voltage of the reference voltage generator circuit 1200 by using the bias voltage VG. Here, the change of the voltage of the reference voltage generator circuit 1200 may come from a process, voltage, and temperature (PVT) variation.

The reference voltage generator circuit 1200 may supply a reference voltage VREF to any other component(s) included in the electronic device 1000 or to an external device of the electronic device 1000. The reference voltage generator circuit 1200 may generate the reference voltage VREF based on the bias voltage VG supplied from the adaptive cascode circuit 1100. In an embodiment of the present disclosure, the reference voltage generator circuit 1200 may be a bandgap reference (BGR) circuit.

The reference voltage VREF generated by the reference voltage generator circuit 1200 may be uniform regardless of a temperature change. For example, the reference voltage generator circuit 1200 may generate the reference voltage VREF, which is uniform even in the event of a temperature change, based on a voltage proportional to a temperature and a voltage inversely proportional to a temperature.

Figure 2:
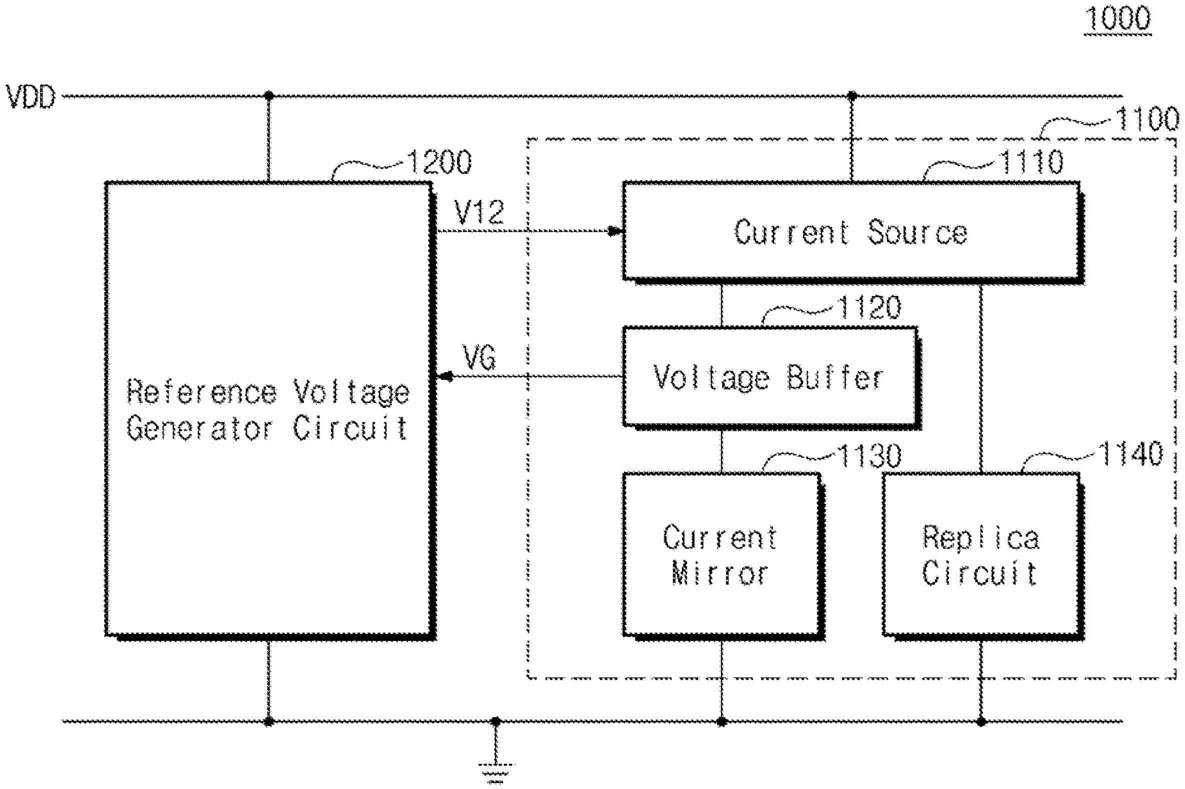
FIG. 2 illustrates a block diagram of an adaptive cascade circuit of FIG. 1 in detail.

FIG. 2 illustrates a block diagram of the adaptive cascode circuit 1100 of FIG. 1 in detail. Referring to FIGS. 1 and 2, the adaptive cascode circuit 1100 may include a current source 1110, a voltage buffer 1120, a current mirror 1130, and a replica circuit 1140. As a power supply voltage, a voltage VDD may be supplied to the adaptive cascode circuit 1100 and the reference voltage generator circuit 1200.

The current source 1110 of the adaptive cascode circuit 1100 may generate various currents, which are used within the adaptive cascode circuit 1100, based on the voltage VDD and the voltage V12. The current source 1110 may supply the generated currents to the voltage buffer 1120 and the replica circuit 1140.

The voltage buffer 1120 may generate the bias voltage VG, based on a current supplied from the current source 1110. The voltage buffer 1120 may buffer voltages generated within the adaptive cascode circuit 1100. The voltage buffer 1120 may supply the bias voltage VG to the reference voltage generator circuit 1200.

The current mirror 1130 may mirror the current supplied from the current source 1110 to the voltage buffer 1120. Through the operation of the current mirror 1130, a magnitude of the current supplied from the current source 1110 to the voltage buffer 1120 may be the same as a magnitude of one of currents used within the reference voltage generator circuit 1200. The current mirror 1130 may be connected to ground.

The replica circuit 1140 may be a replica of one or more components of the reference voltage generator circuit 1200, based on a current supplied from the current source 1110. In an embodiment of the present disclosure, the replica circuit 1140 may be a replica of a part of components including a bipolar junction transistor (BJT) included in the reference voltage generator circuit 1200. The replica circuit 1140 may be connected to ground.

Figure 3:
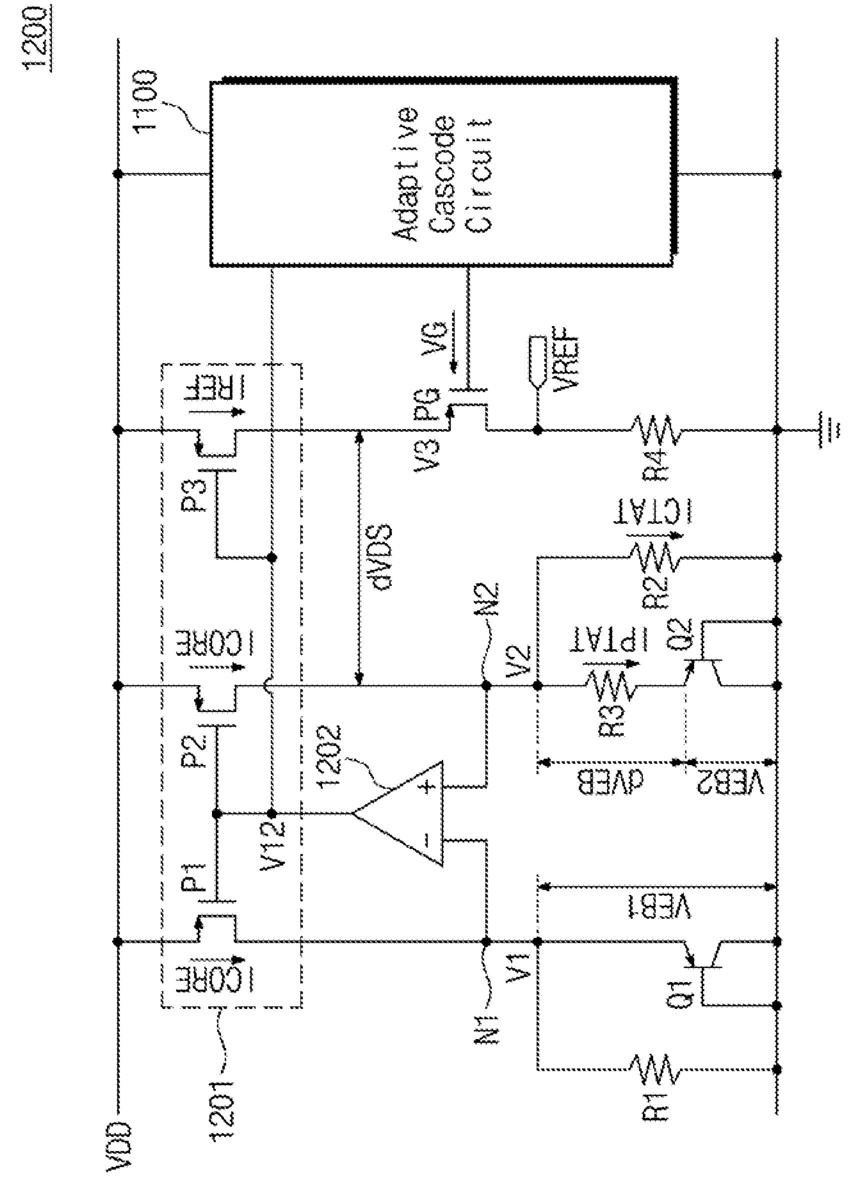
FIG. 3 illustrates a circuit diagram of a reference voltage generator circuit of FIG. 1.

FIG. 3 illustrates a circuit diagram of the reference voltage generator circuit 1200 of FIG. 1, Referring to FIGS. 1 to 3, the reference voltage generator circuit 1200 may include a current source 1201, an amplifier 1202, resistors R1, R2, R3, and R4, and BJTs Q1 and Q2. In an embodiment of the present disclosure, the reference voltage generator circuit 1200 may be a current-mode BUR circuit.

The current source 1110 may transfer currents ICORE and IREF, which are based on the voltage VDD, to any other components of the reference voltage generator circuit 1200. The current source 1110 may include transistors P1, P2, and P3. In an embodiment of the present disclosure, the transistors P2, and P3 may be implemented with a p-channel metal-oxide-semiconductor (PMOS) transistor.

The transistor P1 may include a first end (e.g., a source or first, terminal) to which the voltage VDD is applied, a gate connected to an output terminal of the amplifier 1202, and a second end (e.g., a drain or second terminal) connected to a node N1. Due to the voltage VDD and a voltage V12, the current ICORE may flow from the first end of the transistor P1 to the second end of the transistor P1. Therefore, the current source 1201 may supply the current ICORE to the node N1. The voltage V12 is a voltage of an output node of the amplifier 1202.

The transistor P2 may include a first end (e.g., a source or a first terminal) to which the voltage VDD is applied, a gate connected to the gate of the transistor P1 and the output terminal of the amplifier 1202, and a second end (e.g., a drain or a second terminal) connected to a node N2. Due to the voltage VDD and the voltage V12, the current ICORE may flow from the first end of the transistor P2 to the second end of the transistor P2. Therefore, the current source 1201 may supply the current ICORE to the node N2.

The transistor P1 and the transistor P2 may be turned on or turned off in response to the voltage V12 associated with a difference between a voltage V1 of the node N1 and a voltage V2 of the node N2. In other words, the voltage V12 may turn the transistors P1 and P2 on or off. The transistor P1 and the transistor P2 may supply currents of the same magnitude to the node N1 and the node N2, respectively.

The transistor P3 may include a first end (e.g., a source or first terminal) to which the voltage VDD is applied, a gate connected to the output terminal of the amplifier 1202, and a second end (e.g., a drain or second terminal) connected to a first end (e.g., a source or first terminal) of a transistor PG. A voltage applied to the gate of the transistor P3 may be the voltage V12 associated with the difference between the voltage V1 of the node N1 and the voltage V2 of the node N2. The voltage V12 may turn the transistor P3 on or off. Due to the voltage VDD and the voltage V12, the current IREF may flow from the first end of the transistor P3 to the second end of the transistor P3. Therefore, the current source 1201 may supply the current IREF to the first end of the transistor PG.

The amplifier 1202 may include a first input terminal (e.g., an inverting input terminal) connected to the node N1 and a second input terminal (e.g., a non-inverting input terminal) connected to the node N2. The node N1 may be referred to as the first node and the node N2 may be referred to as the second node. The amplifier 1202 may amplify a difference between the voltage V1 of the node N1 and the voltage V2 of the node N2. The voltage V12, which is the voltage amplified by the amplifier 1202, may be applied to the gate of the transistor P1, the gate of the transistor P2, and the adaptive cascade circuit 1100. The transistor P1 and the transistor P2 may operate in response to the voltage V12.

The BJT Q1 may be connected between the node N1 and a ground terminal (or node). The BIT Q1 may include a first end (e.g., an emitter or first terminal) connected to the node N1, a base connected to the ground terminal, and a second end (e.g., a collector or second terminal) connected to the ground terminal. The BJT Q1 may be a diode-connected transistor.

The BJT Q2 may be connected between the resistor R3 and the ground terminal. The BJT Q2 may include a first end (e.g., an emitter or first terminal) connected to the resistor R3, a base connected to the ground terminal, and a second end (e.g., a collector or second terminal) connected to the ground terminal. The BJT Q2 may be a diode-connected transistor.

A size of the BJT Q2 may be an integer multiple of a size of the BJT Q1. In an embodiment of the present disclosure, the size of the BIT Q2 may be 8 times or 15 times the size of the BJT Q1, but the size of the BJT Q2 is not limited thereto.

The resistor R1 may be connected between the node N1 and the ground terminal. The resistor R2 may be connected between the node N2 and the ground terminal. The resistor R3 may be connected between the node N2 and the first end (e.g., an emitter) of the BJT Q2.

The voltage V1 and the voltage V2 may be substantially the same through the operations of the amplifier 1202 and the transistors P1 and P2. The voltage V1 may be referred to as the first voltage, and the voltage V2 may be referred to as the second voltage. The voltage V1 may correspond to an emitter-base voltage VEB1. For example, the voltage V1 may be equal to the emitter-base voltage VEB1. The voltage VEB2 may correspond to a sum of a voltage dVEB across the resistor R3 and an emitter-base voltage VEB2 of the BJT Q2. For example, the voltage V2 may be equal to dVEB+VEB2. Accordingly, the voltage dVEB may correspond to a difference between the emitter-base voltage VEB1 of the BJT Q1 and the emitter-base voltage VEB2 of the BJT Q2. In other words, dVEB=VEB1−VEB2.

In an embodiment of the present disclosure, an emitter-base voltage of a PNP BJT may be complementary to a temperature. Therefore, the emitter-base voltage VEB1 of the BJT Q1 and the emitter-base voltage VEB2 of the BJT Q2 may decrease as a temperature increases. In an embodiment of the present disclosure, the size of the BJT Q2 may be larger than the size of the BJT Q1. As such, the variations of the voltage VEB2 according to a temperature may be greater than the variations of the voltage VEB1 according to a temperature.

A current IPTAT flowing through the resistor R3 may be obtained by dividing the voltage dVEB by a value of the resistor R3. Because the variations of the voltage VEB2 according to a temperature are greater than the variations of the voltage VEB1 according to a temperature, the voltage dVEB may increase as a temperature increases. Accordingly, the current IPTAT may be proportional to a temperature.

A current ICTAT flowing through the resistor R2 may be obtained by dividing the voltage V2 by a value of the resistor R2. Because the voltage V2 is substantially the same as the voltage V1, the voltage V2 may be the same as the voltage VEB1. Accordingly, the current ICTAT may be inversely proportional to a temperature. Likewise, a current flowing through the resistor R1 may be inversely proportional to a temperature.

The current ICORE may correspond to a sum of the current ICTAT inversely proportional to a temperature and the current IPTAT proportional to a temperature. As a value of the resistor R2 and a value of the resistor R3 are adjusted, the current ICORE corresponding to a sum of the current ICTAT and the current IPTAT may be irrelevant to a temperature. In other words, a value of the resistor R2 and a value of the resistor R3 may be adjusted such that the current ICORE does not depend on a temperature.

Because the voltage V1 and the voltage V2 are substantially the same, the current IREF may be substantially the same as the current ICORE. Accordingly, the current IREF may not depend on a temperature.

The transistor PG may include the first end (e.g., a source) connected to the second end of the transistor P3, a gate to which the bias voltage VG from the adaptive cascade circuit 1100 is applied, and a second end (e.g., a drain) connected to the resistor R4. A voltage of the first end of the transistor PG may be a voltage V3.

In an embodiment of the present disclosure, the adaptive cascode circuit 1100 may apply the bias voltage VG to the transistor PG such that the voltage V3 is the same as the voltage V1 of the node N1, When the transistor PG is turned on by the bias voltage VG, the reference current IREF may flow to the resistor R4 through the transistor PG.

The resistor R4 may be connected between the second end of the transistor PG and the ground terminal. The reference voltage VREF may be associated with the resistor R4 and the reference current IREF. In other words, the reference voltage VREF may be output from a node between the second end of the transistor PG and the resistor R4. Accordingly, the reference voltage generator circuit 1200 may output the reference voltage VREF that is uniform regardless of a change of a temperature.

The emitter-base voltage VEB1 (e.g., the voltage V1) of the BJT Q1 and the emitter-base voltage VEB2 of the BIT Q2 may be inversely proportional to a temperature, while the reference voltage VREF may be irrelevant to a change of a temperature. In some embodiments of the present disclosure, unlike the embodiment illustrated in FIG. 3, the reference voltage generator circuit 1200 may not include the transistor PG. In other words, the second end of the transistor P3 may be connected to a node from which the reference voltage VREF is output. In such embodiments, due to a temperature change, a drain-source voltage of the transistor P1/P2 and a drain-source voltage of the transistor P3 may be different. For example, a difference dVDS between the drain-source voltage of the transistor P1/P2 and the drain-source voltage of the transistor P3 may correspond to a difference between the voltage V1 and the reference voltage VREF.

In some embodiments of the present disclosure, “dVDS” may not be “0”. For example, “dVDS” may not be “0” due to various factors, such as a process change, a voltage change, as well as a temperature change. In the above embodiments, due to channel length modulation of the transistors P1, P2, and P3, the current WORE flowing through the transistor P1 and the transistor P2 and the current IREF flowing through the transistor P3 may be different. As a result, the accuracy of the reference voltage VREF output from the reference voltage generator circuit 1200 may decrease.

The adaptive cascode circuit 1100 may prevent the mismatch between the current IREF and the current ICORE due to the channel length modulation of the transistors P1, P2, and P3 by applying the bias voltage VG to the gate of the transistor PG. In an embodiment of the present disclosure, the adaptive cascode circuit 1100 may compensate for a change of the emitter-base voltage VEB1 of the BJT Q1 according to a temperature by using the bias voltage VG.

Figure 4:
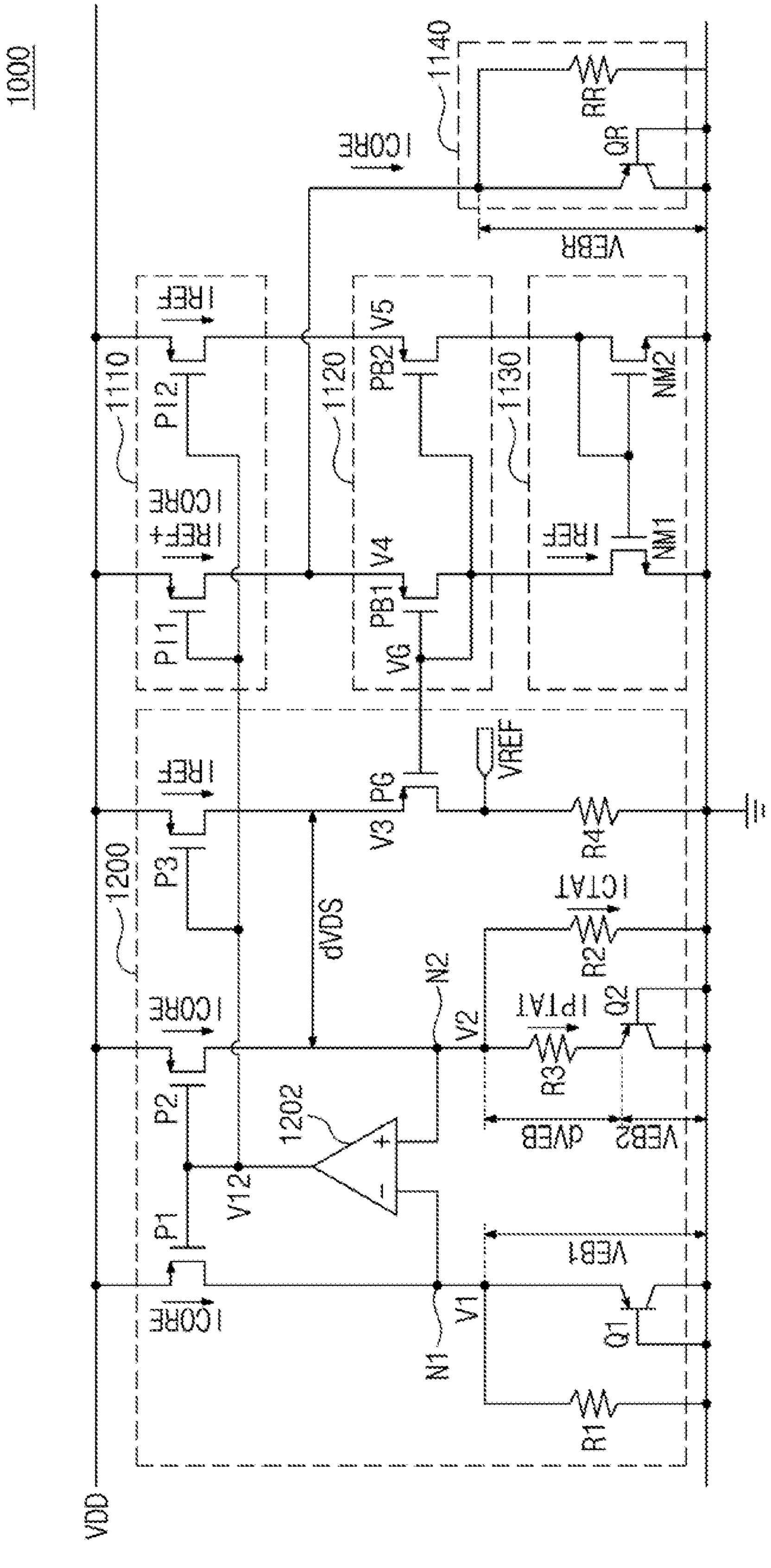
FIG. 4 illustrates a circuit diagram of an electronic device of FIG. 1.
Figure 5:
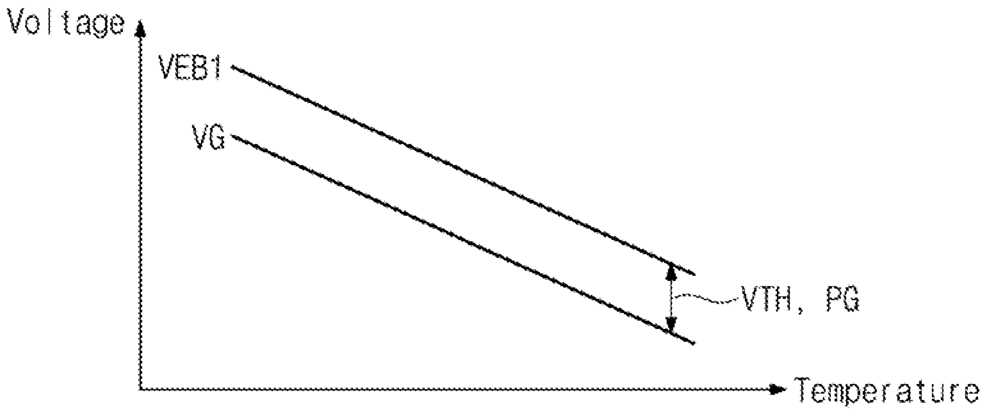
FIG. 5 illustrates a graph indicating changes of voltages associated with an electronic device of FIG. 1 when a temperature changes.

FIG. 4 illustrates a circuit diagram of the electronic device 1000 of FIG. 1. The circuit diagram of the adaptive cascode circuit 1100 will be described with reference to FIGS. 1 to 4.

The current source 1110 of the adaptive cascode circuit 1100 may include transistors PI1 and PI2. In an embodiment of the inventive concept, the transistors PI1 and PI2 may be implemented with a PMOS transistor.

The transistor PH may include a first end (e.g., a source or first terminal) to which the voltage VDD is applied, a gate connected to the output terminal of the amplifier 1202 in the reference voltage generator circuit 1200, and a second end (e.g., a drain or second terminal). A current that corresponds to a sum of the current ICORE and the current IREF (e.g., IREF+ICORE) may flow from the first end of the transistor PI1 to the second end of the transistor PI1. In an embodiment of the present disclosure, a size of the transistor PI1 may correspond to a sum of the size of the transistor P1 and the size of the transistor P3. The current source 1110 may supply the current IREF, which is a bias current of the transistor PG, to a transistor PB1 of the voltage buffer 1120 through the transistor PI1, and may supply the current ICORE to the replica circuit 1140.

The transistor PI2 may include a first end (e.g., a source or first terminal) to which the voltage VDD is applied, a gate connected to the output terminal of the amplifier 1202 in the reference voltage generator circuit 1200, and a second end (e.g., a drain or second terminal) connected to the voltage buffer 1120. The current IREF may flow from the first end of the transistor PI1 to the second end of the transistor PI2. In an embodiment of the inventive concept, a size of the transistor PI2 may be the same as the size of the transistor P3. The current source 1110 may supply the current IREF, which is the bias current of the transistor PG, to a transistor PB2 of the voltage buffer 1120 through the transistor PI2.

The voltage buffer 1120 may include transistors PB1 and PB2. In an embodiment of the inventive concept, the transistors PB1 and PB2 may be implemented with a PMOS transistor.

The transistor PB1 may include a first end (e.g., a source or first terminal) connected to the second end of the transistor PI1, a gate connected to the gate of the transistor PG of the reference voltage generator circuit 1200, and a second end (e.g., a drain or second terminal) connected to a gate of the transistor PB2. The gate of the transistor PB1 may be connected to the second end of the transistor PB1. In other words, the transistor PB1 may be diode-connected.

The transistor PB2 may include a first end (e.g., a source or first terminal) connected to the second end of the transistor PI2 of the current source 1110, a gate connected to the second end of the transistor PB1, and a second end (e.g., a drain or second terminal) connected to the current mirror 1130. The gate of the transistor PB2 may be connected to the gate of the transistor PB1 and the gate of the transistor PG. The bias voltage VG may be applied to the gates of the transistors PG, PB1, and PB2.

The current mirror 1130 may include transistors NM1 and NM2. In an embodiment of the present disclosure, the transistors NM1 and NM2 may be implemented with an n-channel metal-oxide-semiconductor (NMOS) transistor. A size of the transistor NM1 may be the same as a size of the transistor NM2.

The transistor NM1 may include a first end (e.g., a drain or first terminal) connected to the second end of the transistor PB1 of the voltage buffer 1120, a gate connected to a gate of the transistor NM2, and a second end (e.g., a source of second terminal) connected to the ground terminal. The transistor NM2 may include a first end (e.g., a drain or first terminal) connected to the second end of the transistor PB2 of the voltage buffer 1120, a gate connected to the gate of the transistor NM1, and a second end (e.g., a source or second terminal) connected to the ground terminal. The first end of the transistor NM2 may be connected to the gate of the transistor NM1. In other words, the transistor NM2 may be diode-connected.

A current applied to the first end of the transistor NM2 may be copied (or mirrored) to the transistor NM1. For example, the current applied to the first end of the transistor NM2 may be the same as a current applied to the first end of the transistor NM1. For example, the current IREF may be applied to both first ends of the transistors NM1 and NM2. A bias current of the transistor PB1 of the voltage buffer 1120 may be the same as a bias current of the transistor PB2 of the voltage buffer 1120. In other words, the bias current of the transistor PG, the bias current of the transistor PB1, and the bias current of the transistor PB2 may be the same as the current IREF. As a result, a gate-source voltage of the transistor PG, a gate-source voltage of the transistor PB1, and a gate-source voltage of the transistor PB2 may be the same. In addition, the voltage V3 of the first end of the transistor PG, a voltage V4 of the first end of the transistor PB1, and a voltage V5 of the first end of the transistor PB2 may be the same.

The replica circuit 1140 may include a BJT QR and a resistor RR. In an embodiment of the present disclosure, the replica circuit 1140 may be implemented as a replica of the BJT Q1 and the resistor R1 of the reference voltage generator circuit 1200.

The BJT QR may include a first end (e.g., an emitter or first terminal) connected to the second end of the transistor PI1 of the current source 1110, a base connected to the ground terminal, and a second end (e.g., a collector or second terminal) connected to the ground terminal. The BJT QR may be diode-connected. The BJT QR may be implemented as a PNP BJT. In an embodiment of the present disclosure, the size of the BJT QR may be the same as the size of the BJT Q1 of the reference voltage generator circuit 1200.

The resistor RR may be connected between the second end of the transistor PI1 of the current source 1110 and the ground terminal. In an embodiment of the present disclosure, a value of the resistor RR may be the same as the value of the resistor R1 of the reference voltage generator circuit 1200.

The BJT QR of the replica circuit 1140 may be a replica of the BJT Q1 of the reference voltage generator circuit 1200, and the resistor RR of the replica circuit 1140 may be a replica of the resistor R1 of the reference voltage generator circuit 1200. Accordingly, a sum of a current flowing from the first end of the BJT QR to the second end of the BJT QR and a current flowing through the resistor RR may correspond to the current ICORE which is a current at the node N1 of the reference voltage generator circuit 1200.

An emitter-base voltage VEBR of the BJT QR may be the same as the emitter-base voltage VEB1 of the BJT Q1 of the reference voltage generator circuit 1200. Accordingly, regardless of the PVT variation, the voltage V1 of the reference voltage generator circuit 1200 and the voltage V4 of the voltage buffer 1120 may be substantially the same. As the bias voltage VG is applied to the gates of the transistor PG of the reference voltage generator circuit 1200 and the transistor PB2 by the voltage buffer 1120, the voltage V3 of the first end of the transistor PG and the voltage V5 of the first end of the transistor PB2 may be substantially the same as the voltage V4. As a result, the voltage V4 may be regarded as being buffered by the voltage buffer 1120 to the voltage V3 and the voltage V5. In other words, the adaptive cascade circuit 1100 may supply the bias voltage VG adaptive to the PVT variation to the reference voltage generator circuit 1200.

The voltage V1 and the voltage V2 may be substantially the same by using the amplifier 1202 of the reference voltage generator circuit 1200. As a result, regardless of the PVT variation, the voltage V1, the voltage V2, the voltage V3, the voltage V4 and the voltage V5 may be substantially the same. Accordingly, the transistors P1, P2, P3, PI1, and PI2 may have substantially the same gate-source voltage and substantially the same drain-source voltage.

Because the magnitudes of the voltages V1, V2, V3, V4, and V5 are substantially the same, the influence of the channel length modulation on currents flowing through the transistors P1, P2, P3, PI1, and PI2 may decrease. Accordingly, a mismatch between the current ICORE and the current IREF may be reduced. As a result, regardless of the PVT variation, the accuracy of the reference voltage VREF output from the reference voltage generator circuit 1200 may be maintained.

FIG. 1 illustrates a graph indicating changes of voltages associated with the electronic device 1000 of FIG. 1 when a temperature changes. How the emitter-base voltage VEB1 of the BJT Q1 of the reference voltage generator circuit 1200 and the bias voltage VG generated by the adaptive cascade circuit 1100 change depending on a temperature will be described with reference to FIGS. 1 to 5.

The emitter-base voltage VEB1 of the BJT Q1 may be inversely proportional to a temperature. The adaptive cascode circuit 1100 may generate the bias voltage VG, which is inversely proportional to a temperature, with the same slope as the emitter-base voltage VEB1 of the BJT Q1. In other words, a magnitude of the bias voltage VG may be adaptively variable to a change of the emitter-base voltage VEB1 of the BJT Q1 due to a temperature change. In an embodiment of the present disclosure, the magnitude of the bias voltage VG may correspond to a difference between a magnitude of the emitter-base voltage VEB1 of the BJT Q1 and a threshold voltage VTH of the transistor PG. The difference in voltage between the bias voltage VG and the emitter-base voltage VEB1 of the BJT Q1 may remain constant as temperature changes.

The voltage V3 of the first end of the transistor PG may be substantially the same as the voltage V1 of the node N1 through the bias voltage VG that is adaptively variable. As such, regardless of the PVT variation, the drain-source voltage of the transistor P1 may be substantially the same as the drain-source voltage of the transistor P3. Accordingly, the influence of the channel length modulation of the transistors P1, P2, and P3 may be ignored. The current ICORE flowing to the transistor P1 may be copied to the transistor P3, based on a ratio of the transistor P1 and the transistor P3. As the mismatch between the current ICORE and the current IREF is reduced, the performance of the reference voltage generator circuit 1200 may be improved.

Figure 6:
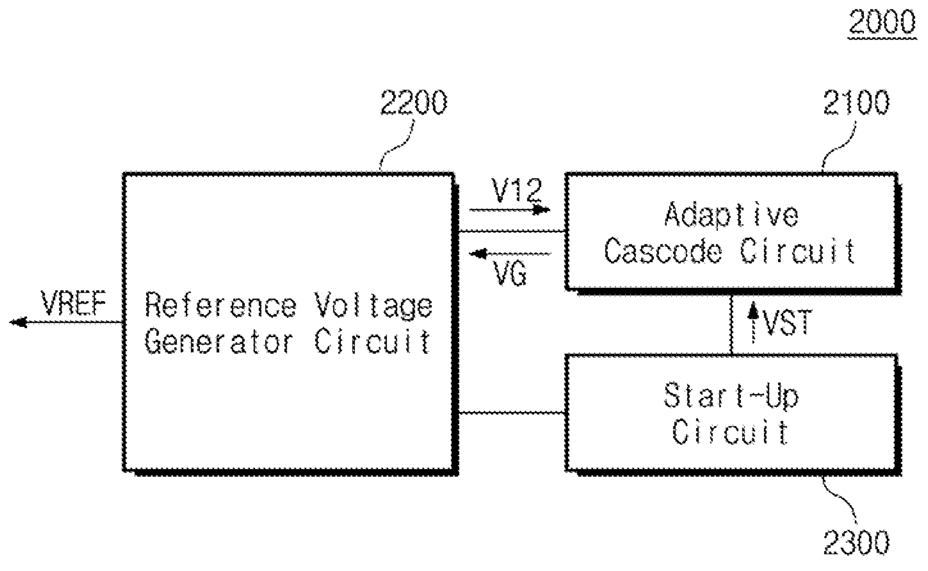
FIG. 6 illustrates a block diagram of an electronic device according to an embodiment of the present disclosure.

FIG. 6 illustrates a block diagram of an electronic device 2000 according to an embodiment of the present disclosure. Referring to FIGS. 1 and 6, the electronic device 2000 may include an adaptive cascode circuit 2100, a reference voltage generator circuit 2200, and a start-up circuit 2300.

The adaptive cascode circuit 2100 may supply the bias voltage VG to the reference voltage generator circuit 2200. The reference voltage generator circuit 2200 may generate the reference voltage VREF, based on the bias voltage VG. In an embodiment of the present disclosure, a configuration and an operation of the adaptive cascode circuit 2100 may be similar to those of the adaptive cascode circuit 1100 of the electronic device 1000 of FIG. 1. A configuration and an operation of the reference voltage generator circuit 2200 may be similar to those of the reference voltage generator circuit 1200 of the electronic device 1000 of FIG. 1.

The start-up circuit 2300 may perform a start-up operation of the adaptive cascode circuit 2100 and the reference voltage generator circuit 2200. After the electronic device 2000 is initialized, the start-up circuit 2300 may supply a start-up voltage VST to the adaptive cascode circuit 2100 during a given time. As the start-up voltage VST is supplied to the adaptive cascode circuit 2100, a magnitude of the bias voltage VG may decrease, and a magnitude of the reference voltage VREF of the reference voltage generator circuit 2200 may increase from a ground voltage.

Figure 7:
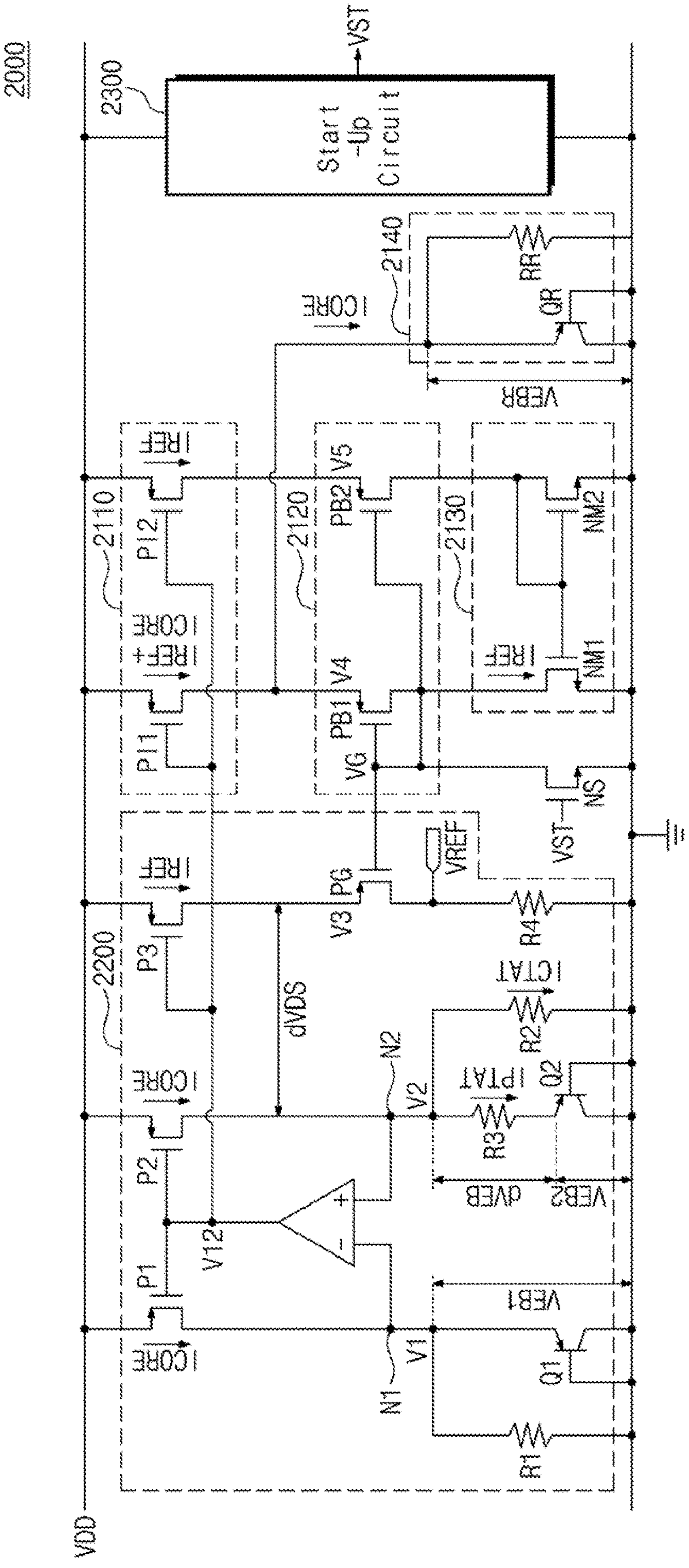
FIG. 7 illustrates a circuit diagram of an electronic device of FIG. 6.

FIG. 7 illustrates a circuit diagram of the electronic device 2000 of FIG. 6. A difference between the electronic device 1000 and the electronic device 2000 will be described with reference to FIGS. 4, 6, and 7.

The reference voltage generator circuit 2200 of the electronic device 2000 may be substantially the same as the reference voltage generator circuit 1200 of the electronic device 1000. Unlike the adaptive cascode circuit 1100 of the electronic device 1000, the adaptive cascode circuit 2100 of the electronic device 2000 may further include a transistor NS.

The transistor NS may include a first end (e.g., a drain or first terminal) to which the bias voltage VG is applied, a gate to which the start-up voltage VST is applied, and a second end (e.g., a source or second terminal) connected to the ground terminal. In an embodiment, the transistor NS may be implemented with an NMOS transistor.

The transistor NS may be turned on or turned off in response to the start-rip voltage VST. When the transistor NS is turned on, the transistor NS may electrically connect a node, at which the bias voltage VG is formed, with the ground terminal. As such, the bias voltage VG may be pulled down. When the transistor NS is turned off, the transistor NS may electrically disconnect the node, at which the bias voltage VG is formed, from the ground terminal.

The reference voltage generator 2200, the current source 2110, the voltage buffer 2120, the current mirror 2130 and the replica circuit 2140 shown in FIG. 7 may correspond to the reference voltage generator 1200, the current source 1110, the voltage buffer 1120, the current mirror 1130 and the replica circuit 1140 shown in FIG. 4.

Figure 8:
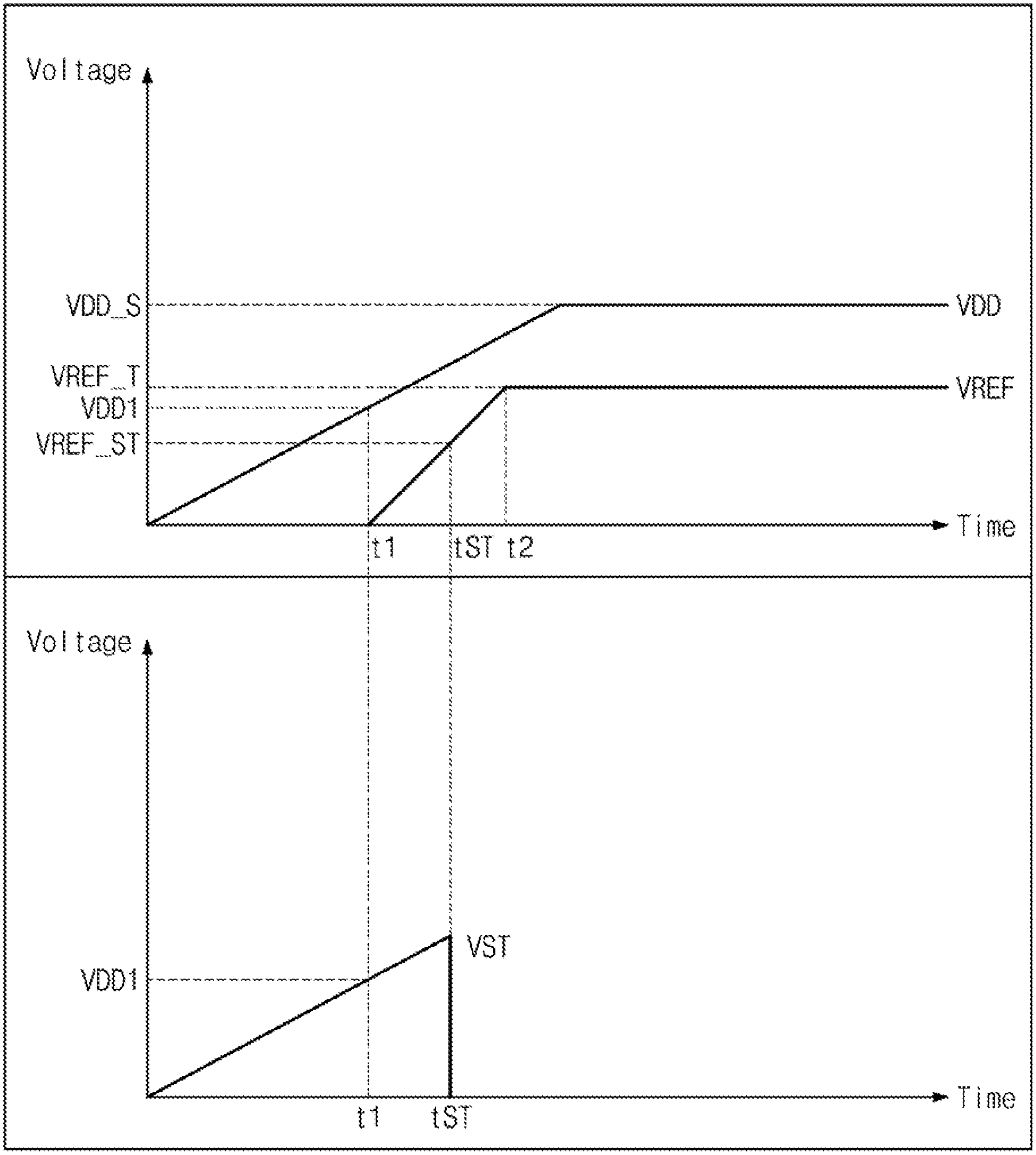
FIG. 8 illustrates a graph indicating changes of voltages associated with an electronic device of FIG. 6 over time.

FIG. 8 illustrates a graph indicating changes of voltages associated with the electronic device 2000 of FIG. 6 over time. Changes of the voltage VDD, the start-up voltage VST, and the reference voltage VREF over time will be described with reference to FIGS. 4 and 6 to 8.

After the electronic device 2000 is initialized, the voltage VDD may gradually increase from a ground voltage to a target power supply voltage VDD_S. In an embodiment of the present disclosure, the target power supply voltage VDD_S may be 1.2 V or less. After a magnitude of the voltage VDD becomes sufficiently large, the reference voltage VREF may be output from the reference voltage generator circuit 2200. For example, in the case where a magnitude of the voltage VDD is large enough to turn on the transistors P1, P2, P3, and PG of the reference voltage generator circuit 2200, the reference voltage VREF may be generated.

In the embodiment illustrated in FIG. 8, the voltage VDD may gradually increase to the target power supply voltage VDD_S from a time when the electronic device 2000 is initialized. For example, the electronic device 2000 may be initialized at a time prior to a time t1. At the time t1, as the voltage VDD reaches a voltage VDD1, the reference voltage VREF may be generated from the reference voltage generator circuit 2200. For example, in response to the increasing voltage VDD, the voltage V1 of the node N1 of the reference voltage generator circuit 2200 may gradually increase. The reference voltage VREF may also increase in response to the increasing voltage V1.

As the voltage VDD increases, the reference voltage VREF may increase. A magnitude of the reference voltage VREF may be fixed to a given voltage. For example, from a time t2, the reference voltage VREF may be fixed to a voltage having a magnitude of a target reference voltage VREF_T. In other words, the reference voltage generator circuit 2200 may output a uniform target voltage as the reference voltage VREF.

From a time when the electronic device 2000 is initialized to a time tST, the start-up circuit 2300 may generate the start-up voltage VST, the magnitude of which is the same as that of the voltage VDD. The start-up circuit 2300 may provide the start-up voltage VST to the transistor NS of the adaptive cascode circuit 2100. From a time when the start-up voltage VST is greater than the threshold voltage of the transistor NS, the transistor NS may be turned on, and, the bias voltage VG may be pulled down. As such, the transistor PG of the reference voltage generator circuit 2200 and the transistors PB1 and PB2 of the adaptive cascode circuit 2100 may be turned on. As all the transistors PG, PB1, and PB2 are turned on, the reference voltage VREF may start to be output from the reference voltage generator circuit 2200.

In an embodiment of the present disclosure, the start-up circuit 2300 may advance a time, at which the reference voltage VREF starts to be output, by adjusting a magnitude of the bias voltage VG. The start-up circuit 2300 may advance a time, at which the transistor PG is turned on, by pulling down the bias voltage VG applied to the gate of the transistor NS. As such, the reference voltage generator 2200 may output the reference voltage VREF more quickly. The voltage VDD1 corresponding to the start-up voltage VST at the time t1 may be greater than the threshold voltage of the transistor NS.

After the time tST, the start-up circuit 2300 may generate the start-up voltage VST, the magnitude of which is the same as that of the ground voltage. The time tST may be a time at which a magnitude of the reference voltage VREF becomes a predetermined value. In the embodiment illustrated in FIG. 8, the time tST may be a time at which the magnitude of the reference voltage VREF becomes a magnitude of a voltage VREF_ST. The time tST may precede the time t2 when the reference voltage VREF reaches the target reference voltage VREF_T.

The time tST when the start-up voltage VST transitions to the ground voltage may be determined based on various factors such as a process and a temperature. As the start-up voltage VST is substantially the same as the ground voltage, the transistor NS may be turned off. Accordingly, after the time tST, the start-up circuit 2300 may not substantially affect the magnitude of the bias voltage VG.

Figure 9:
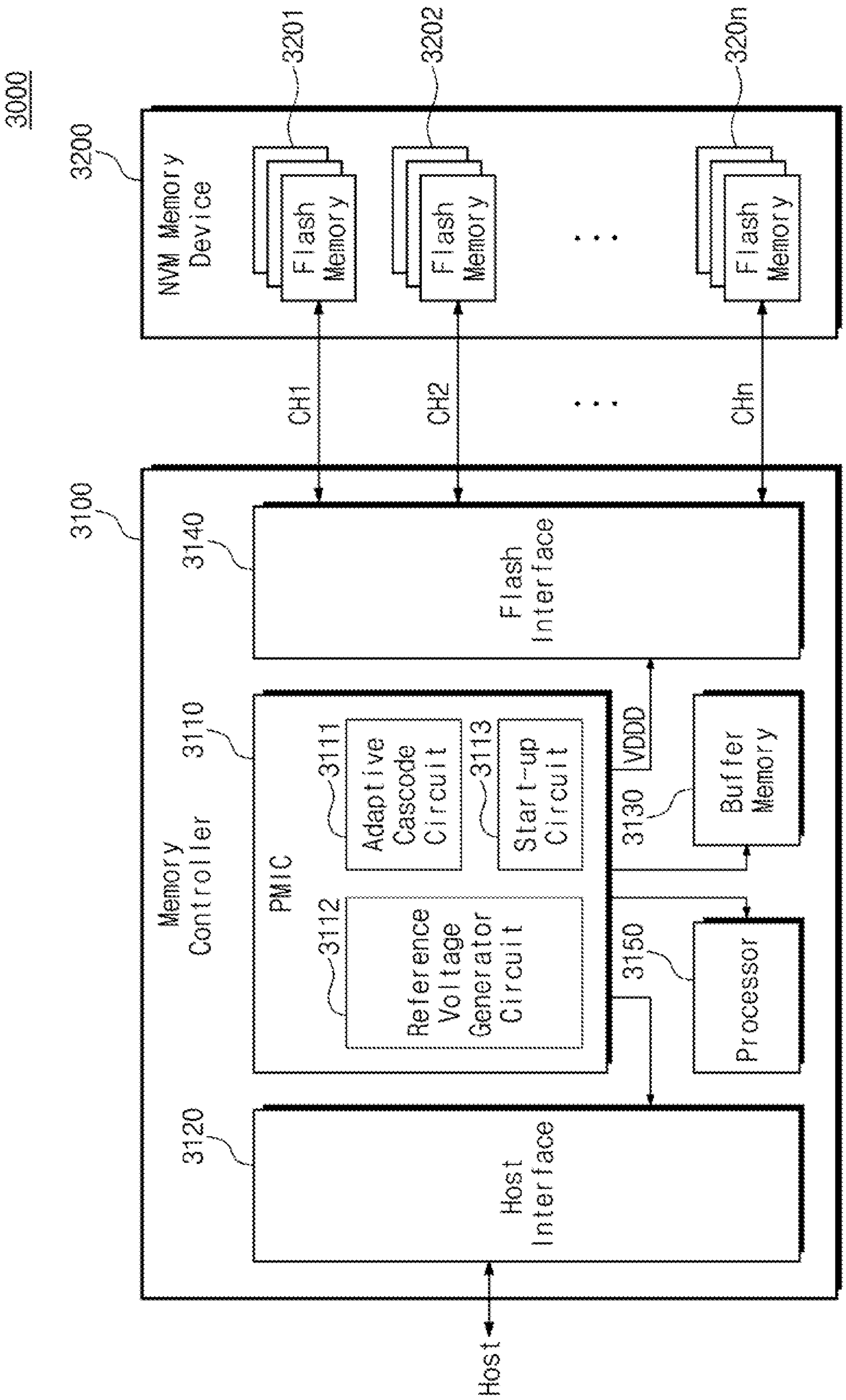
FIG. 9 illustrates a block diagram of a storage device according to an embodiment of the present disclosure.

FIG. 9 illustrates a block diagram of a storage device 3000 according to an embodiment of the present disclosure. Referring to FIG. 9, the storage device 3000 may include a memory controller 3100 and a nonvolatile memory device 3200. In an embodiment of the present disclosure, the storage device 3000 may be a solid state drive (SSD).

The memory controller 3100 may include a power management integrated circuit (PMIC) 3110, a host interface 3120, a buffer memory 3130, a flash interface 3140, and a processor 3150. The memory controller 3100 may receive various requests for wilting data in the nonvolatile memory device 3200 or reading data from the nonvolatile memory device 3200 from an external host device.

The PMIC 3110 may generate a driving voltage VDDD, based on a voltage supplied from an external device. The PMIC 3110 may supply the driving voltage VDDD to components of the memory controller 3100.

The PMIC 3110 may include an adaptive cascode circuit 3111, a reference voltage generator circuit 3112, and a start-up circuit 3113. The adaptive cascode circuit 3111 may be similar to the adaptive cascode circuit 1100 of FIG. 1 or the adaptive cascode circuit 2100 of FIG. 6. The reference voltage generator circuit 3112 may be similar to the reference voltage generator circuit 1200 of FIG. 1. The start-up circuit 3113 may be similar to the start-up circuit 2300 of FIG. 6. In some embodiments of the present disclosure, the adaptive cascode circuit 3111, the reference voltage generator circuit 3112, and the start-up circuit 3113 may be included in other components of the memory controller 3100.

The PMIC 3110 may generate the driving voltage VDDD for an operation of the storage device 3000 by using a reference voltage that is generated from the reference voltage generator circuit 3112 and is uniform regardless of a temperature change. For example, the adaptive cascode circuit 3111 may generate a bias voltage to compensate for a change of an emitter-base voltage (or a base-emitter voltage) of a BJT in the reference voltage generator circuit 3112, which occurs due to a temperature change. Regardless of the PVT variation, the reference voltage generator circuit 3112 may generate a uniform reference voltage in response to the bias voltage generated from the adaptive cascode circuit 3111. The reference voltage generator circuit 3112 may generate a fine reference voltage even under a relatively low power supply voltage. As such, the memory controller 3100 may be provided which improves performance while less consuming a power.

The host interface 3120 may receive various requests from the external host. For example, the host interface 3120 may decode the received requests. The host interface 3120 may store the decoded requests in the buffer memory 3130. The host interface 3120 may transmit data to the external host in response to the received requests.

The buffer memory 3130 may include a random access memory (RAM). For example, the buffer memory 3130 may include a static RAM (SRAM) or a dynamic RAM (DRAM). Under control of the processor 3150, the buffer memory 3130 may temporarily store requests received from the external host, data to be written in the nonvolatile memory device 3200, or data read out from the nonvolatile memory device 3200.

The flash interface 3140 may communicate with the nonvolatile memory device 3200 under control of the processor 3150. The flash interface 3140 may transmit commands and addresses generated by the processor 3150, and data stored in the buffer memory 3130 to the nonvolatile memory device 3200 through channels CH1 to CHn (n being a positive integer). The flash interface 3140 may receive data stored in the nonvolatile memory device 3200 through the channels CH1 to CHn.

The processor 3150 may drive an operating system or firmware for driving the memory controller 3100. The processor 3150 may generate commands and addresses for controlling the nonvolatile memory device 3200, based on the requests of the external host stored in the buffer memory 3130. The processor 3150 may transmit the generated commands and addresses to the flash interface 3140. Under control of the processor 3150, the data stored in the buffer memory 3130 may be stored in the nonvolatile memory device 3200 by the flash interface 3140. Under control of the processor 3150, the data stored in the nonvolatile memory device 3200 may be read by the flash interface 3140 and may then be stored in the buffer memory 3130.

The nonvolatile memory device 3200 may include a plurality of flash memories 3201 to 320*n*. The flash memories 3201 to 320*n* may be respectively connected to the channels CH1 to CHn. The nonvolatile memory device 3200 may store data under control of the memory controller 3100. The data stored in the nonvolatile memory device 3200 may be read out under control of the memory controller 3100.

Figure 10:
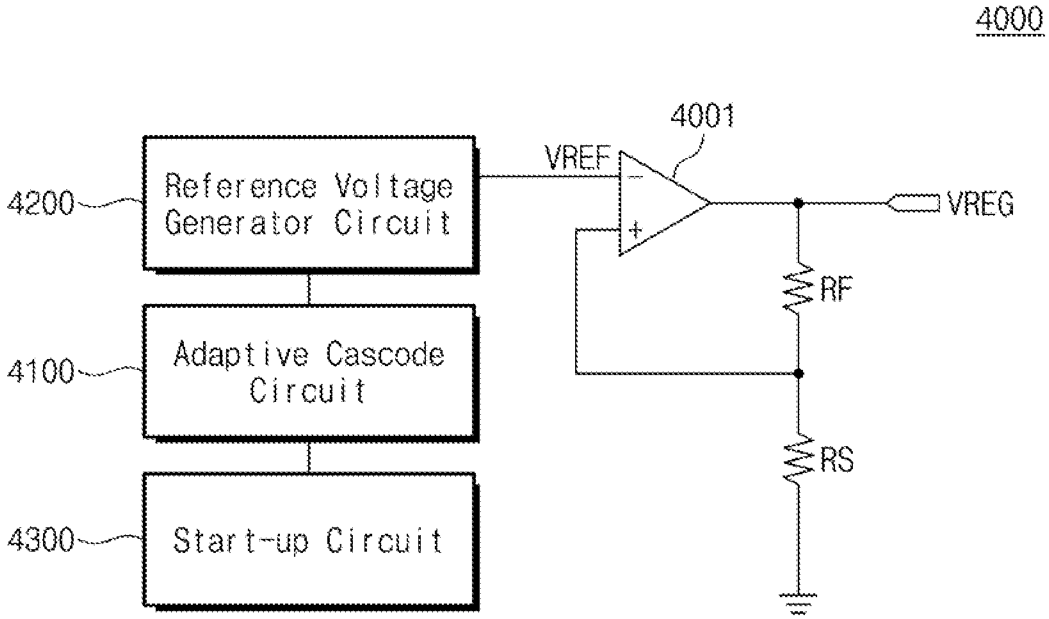
FIG. 10 illustrates a block diagram of a voltage regulator according to an embodiment of the present disclosure.

FIG. 10 illustrates a block diagram of a voltage regulator 4000 according to an embodiment of the present disclosure. Referring to FIG. 10, the voltage regulator 4000 may include an error amplifier 4001, resistors RF and RS, an adaptive cascode circuit 4100, a reference voltage generator circuit 4200, and a start-up circuit 4300.

In an embodiment of the present disclosure, the adaptive cascode circuit 4100 may be similar to the adaptive cascode circuit 1100 of FIG. 1 or the adaptive cascode circuit 2100 of FIG. 6. The reference voltage generator circuit 4200 may be similar to the reference voltage generator circuit 1200 of FIG. 1. The start-up circuit 4300 may be similar to the start-up circuit 2300 of FIG. 6.

The reference voltage generator circuit 4200 may provide the reference voltage VREF to a first input terminal (e.g., an inverting input terminal) of the error amplifier 4001. The error amplifier 4001 may include the first input terminal to which the reference voltage VREF is applied and a second input terminal (e.g., a non-inverting input terminal) connected to a first end of the resistor RS. The error amplifier 4001 may amplify a difference between the reference voltage VREF and a voltage across the resistor RS. The error amplifier 4001 may output the amplified voltage as a regulated voltage VREG.

The resistor RF may be connected between an output terminal of the error amplifier 4001 and the first end of the resistor RS. The resistor RS may be connected between the resistor RF and the ground terminal. The regulated voltage VREG output from the error amplifier 4001 is fed back to the error amplifier 4001 through the resistors RF and RS. The regulated voltage VREG may be variable depending on resistance values of the resistors RF and RS.

The adaptive cascode circuit 4100 may compensate for a change of an emitter-base voltage (or a base-emitter voltage) of a BJT in the reference voltage generator circuit 4200, which occurs due to a temperature change. Accordingly, the reference voltage generator circuit 4200 may output the reference voltage VREF that is uniform regardless of a change of a temperature. As a result, the accuracy of the voltage regulator 4000 may be increased.

Figure 11:
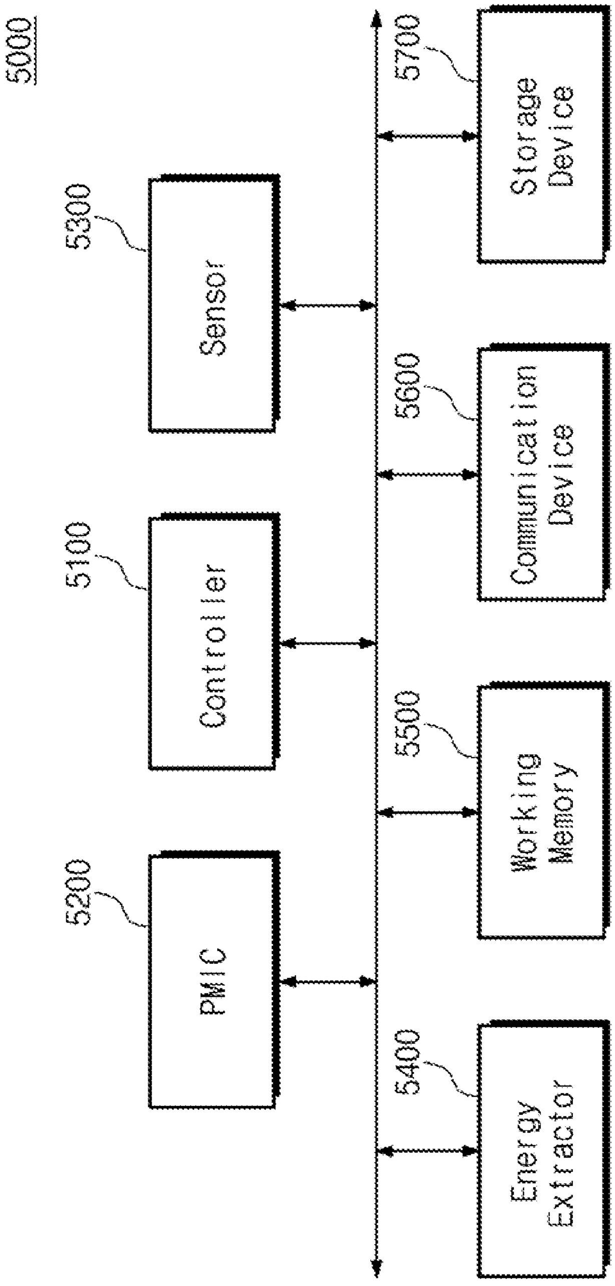
FIG. 11 illustrates a block diagram of an electronic device according to an embodiment of the present disclosure.

FIG. 11 illustrates a block diagram of an electronic device 5000 according to an embodiment of the present disclosure. The electronic device 5000 may include a controller 5100, a PMIC 5200, a sensor 5300, an energy extractor 5400, a working memory 5500, a communication device 5600, and a storage device 5700. The components of the electronic device 5000 may communicate with each other through an internal bus.

The electronic device 5000 may be referred to as a "computing system", a "memory system", an "electronic system", or a "communication system". Alternatively, the electronic device 5000 may be referred to as an "energy harvesting system" or a "battery-less system". For example, the electronic device 5000 may include a laptop computer, a tablet computer, a mobile device, a smartphone, a personal digital assistant (PDA), a portable media player (PMP), a wearable device, an Internet of things (IoT), a drone, etc. As another example, the electronic device 5000 may constitute an IoT system or may be included therein.

The controller 5100 may control an operation of the electronic device 5000. The controller 5100 may be referred as a "processor" or a "microcontroller". The controller 5100 may function as a central processing unit (CPU) of the electronic device 5000. For example, the controller 5100 may include a logic circuit and the like for processing various signals that are generated in the electronic device 5000 or are received from the outside of the electronic device 5000. As another example, the controller 5100 may include a core(s) for executing a plurality of application programs, a plurality of firmware, or a plurality of software loaded onto the working memory 5500.

The PMIC 5200 may provide a driving voltage to the components of the electronic device 5000. For example, the PMIC 5200 may generate voltages of various levels, based on a power supply voltage supplied to the electronic device 5000 through the energy extractor 5400. The PMIC 5200 may provide the generated voltages to other components of the electronic device 5000 as the driving voltage. The other components of the electronic device 5000 may operate based on the driving voltage supplied from the PMIC 5200.

In an embodiment of the present disclosure, the PMIC 5200 may include the adaptive cascode circuit 1100 and the reference voltage generator circuit 1200 of FIG. 1. Alternatively, the PMIC 5200 may include the adaptive cascade circuit 2100, the reference voltage generator circuit 2200, and the start-up circuit 2300 of FIG. 6. The PMIC 5200 may generate a reference voltage, the accuracy of which is increased, based on the power supply voltage supplied from the energy extractor 5400. The PMIC 5200 may provide the driving voltage to the other components of the electronic device 5000, based on the generated reference voltage.

The sensor 5300 may sense an external environment change of the electronic device 5000, a target object, or the like. For example, the sensor 5300 may include a sensor, which senses an ambient environment of the electronic device 5000, such as a temperature sensor. For another example, the sensor 5300 may include a biometric sensor such as a blood sugar sensor, an enzyme sensor, and an immunosensor.

The energy extractor 5400 may be supplied with electrical energy for an operation of the energy extractor 5400 from the outside of the electronic device 5000. For example, the energy extractor 5400 may be supplied with a voltage from the outside of the electronic device 5000. The energy extractor 5400 may include a wired power receiver or a wireless power receiver for receiving a voltage from an external device of the electronic device 5000. For another example, the energy extractor 5400 may include an energy harvesting device or the like. The energy extractor 5400 may obtain (or extract) electrical energy from an ambient environment by using the energy harvesting device.

In some embodiments of the present disclosure, the energy extractor 5400 of the electronic device 5000 may be supplied with a power supply voltage through the energy harvesting device or the wireless power receiver. In the above embodiments, a level of a power supply voltage supplied to the electronic device 5000 may be relatively low. The PMIC 5200 may operate with low power under a low voltage and simultaneously may provide an accurate driving voltage to the other components of the electronic device 5000.

The working memory 5500 may temporarily store data, which are used by the controller 5100 or are to be used thereby. For example, the working memory 5500 may temporarily store data processed by the controller 5100, or a plurality of program codes, a plurality of instructions, or a plurality of software to be executed by the controller 5100. The working memory 5500 may function as a main storage device of the electronic device 5000. The working memory 5500 may be implemented as a RAM such as an SRAM or DRAM.

The communication device 5600 may communicate with an external device of the electronic device 5000 in a wired or wireless manner. The communication device 5600 may receive data for an operation of the electronic device 5000 from the external device. The communication device 5600 may transmit the data generated by the controller 5100 to the external device.

The storage device 5700 may function as an auxiliary storage device of the electronic device 5000. The storage device 5700 may store a variety of instructions, program codes, application programs, or software executable by the controller 5100. The storage device 5700 may store data received from the external device of the electronic device 5000. The storage device 5700 may store data generated by the controller 5100.

According to an embodiment of the present disclosure, an electronic device may include a reference voltage generator circuit and an adaptive cascode circuit that operate at a low power supply voltage. The adaptive cascode circuit may generate a bias voltage to compensate for a change of a turn-on voltage of a transistor in the reference voltage generator circuit, which occurs due to a temperature change. The accuracy of a reference voltage that is generated by the reference voltage generator circuit based on the bias voltage may be increased regardless of a PVT variation.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:

a reference voltage generator circuit configured to generate a difference voltage and a reference voltage based on a first voltage of a first node and a second voltage of a second node; and an adaptive cascode circuit configured to generate a bias voltage based on the difference voltage, wherein the reference voltage generator circuit includes:

a first transistor including a gate to which the bias voltage is applied from the adaptive cascode circuit; and a first current source configured to supply a first current to each of the first node and the second node and to supply a second current to the first transistor, wherein the adaptive cascode circuit includes:

a second current source configured to output a third current and a replica current;

a voltage buffer configured to generate the bias voltage based on the third current;

a current mirror configured to mirror the third current; and a replica circuit configured to be implemented as a replica of one or more components of the reference voltage generator circuit, and wherein the voltage buffer includes:

a second transistor including a gate to which the bias voltage is applied and a second terminal to which the bias voltage is applied; and a third transistor including a gate to which the bias voltage is applied.

2. The electronic device of claim 1, wherein the reference voltage generator circuit further includes an amplifier configured to generate the difference voltage by amplifying a difference between the first voltage and the second voltage, wherein the first current source includes:

a first source transistor connected to the first node and to which the first current is supplied;

a second source transistor connected to the second node and to which the first current is supplied; and a third source transistor including a gate connected to an output terminal of the amplifier and to which the second current is supplied, and wherein a first terminal of the third source transistor is connected to a first terminal of the first transistor.

3. The electronic device of claim 2, wherein the first voltage, the second voltage, and a third voltage, which is applied to the first terminal of the first transistor, are the same.

4. The electronic device of claim 1, wherein the reference voltage generator circuit further includes an amplifier configured to generate the difference voltage by amplifying a difference between the first voltage and the second voltage, and wherein the second current source includes:

a fourth transistor including a gate connected to an output terminal of the amplifier and configured to receive the difference voltage and to output the third current and the replica current in response to the difference voltage; and a fifth transistor including a gate connected to the output terminal of the amplifier and configured to receive the difference voltage and to output the third current in response to the difference voltage.

5. The electronic device of claim 4, wherein an amount of the third current is the same as an amount of the second current.

6. The electronic device of claim 1, wherein a voltage applied to the first terminal of the second transistor, a voltage applied to a first terminal of the third transistor, and a voltage applied to a first terminal of the first transistor are the same.

7. The electronic device of claim 1, wherein the current mirror includes:

a sixth transistor including a first terminal to which the bias voltage is applied and a second terminal connected to a ground terminal; and a seventh transistor including a gate connected to a gate of the sixth transistor, a first terminal connected to the gate of the sixth transistor, and a second terminal connected to the ground terminal.

8. The electronic device of claim 7, wherein a size of the sixth transistor is the same as a size of the seventh transistor.

9. The electronic device of claim 1, wherein the second current source includes a fourth transistor configured to output the replica current, and wherein the replica circuit includes:

an eighth transistor connected between the fourth transistor and a ground terminal; and a first resistor connected in parallel with the eighth transistor.

10. The electronic device of claim 9, wherein the fourth transistor supplies the replica current to the eighth transistor, an amount of the replica current being the same as an amount of the first current.

11. The electronic device of claim 9, wherein the reference voltage generator circuit includes a first bipolar junction transistor (BJT) connected between the first node and the ground terminal, wherein the eighth transistor is implemented with a BJT, and wherein an emitter-base voltage of the eighth transistor is the same as the emitter-base voltage of the first BJT.

12. An electronic device, comprising:

a reference voltage generator circuit configured to generate a difference voltage and a reference voltage based on a first voltage of a first node and a second voltage of a second node;

an adaptive cascode circuit configured to generate a bias voltage based on the difference voltage; and a start-up circuit configured to supply, to the adaptive cascode circuit, a start-up voltage for adjusting a magnitude of the bias voltage, wherein the reference voltage generator circuit includes:

a first transistor including a gate to which the bias voltage is applied from the adaptive cascode circuit; and a first current source configured to supply a first current to each of the first node and the second node and to supply a second current to the first transistor, and wherein the adaptive cascode circuit includes:

a second current source configured to output a third current and a replica current;

a voltage buffer configured to generate the bias voltage based on the third current;

a current mirror configured to mirror the third current; and a replica circuit configured to be implemented as a replica of one or more components of the reference voltage generator circuit.

13. The electronic device of claim 12, wherein the first voltage, the second voltage, and a voltage of a first terminal of the first transistor, which is connected to the first current source, are the same.

14. The electronic device of claim 12, wherein the reference voltage generator circuit includes a first bipolar junction transistor (BJT) connected between the first node and a ground terminal, and wherein the adaptive cascode circuit compensates for a change of an emitter-base voltage of the first BJT, which occurs due to a temperature change, by using the bias voltage.

15. The electronic device of claim 12, wherein the adaptive cascode circuit includes:

a second transistor including a first terminal connected to the gate of the first transistor and a gate to which the start-up voltage is applied.

16. The electronic device of claim 15, wherein the start-up voltage has a magnitude the same as a magnitude of a driving voltage, which is supplied to the electronic device, from when the electronic device is initialized to a first time when a magnitude of the reference voltage corresponds to a first level, and has a magnitude the same as a magnitude of a ground voltage after the first time.

17. The electronic device of claim 12, wherein the voltage buffer includes:

a third transistor including a gate to which the bias voltage is applied and a second terminal to which the bias voltage is applied; and a fourth transistor including a gate to which the bias voltage is applied and through which the third current flows, an amount of the third current being the same as an amount of the second current, and wherein the replica circuit includes a replica transistor supplied with the replica current and to which the first voltage is applied, an amount of the replica current being the same as an amount of the first current.

18. A regulator circuit, comprising:

a reference voltage generator circuit configured to generate a reference voltage based on a first voltage and a second voltage, the reference voltage generator circuit including:

a first current source configured to supply a first current to each of a first node and a second node;

an amplifier configured to amplify a difference between the first voltage of the first node and the second voltage of the second node; and a first transistor supplied with a second current from the first current source, an adaptive cascode circuit configured to generate a bias voltage to be applied to a gate of the first transistor;

a start-up circuit configured to supply, to the adaptive cascode circuit, a start-up voltage for adjusting a magnitude of the bias voltage; and an error amplifying circuit configured to output a regulated voltage, the error amplifying circuit including:

an error amplifier configured to generate the regulated voltage by amplifying a difference between voltages applied from each of a first input terminal and a second input terminal;

a first register connected between an output terminal of the error amplifier and a fourth node; and a second register connected between the fourth node and a ground terminal, wherein the second input terminal is connected to the fourth node, wherein the reference voltage is applied to the first input terminal, and a fourth voltage of the fourth node is applied to the second input terminal, and wherein the first voltage, the second voltage, and a voltage of a first terminal of the first transistor, which is connected to the first current source, are the same.

19. The regulator circuit of claim 18, wherein the reference voltage generator circuit includes a first bipolar junction transistor (BJT) connected between the first node and a ground terminal, and wherein the adaptive cascode circuit compensates for a change of an emitter-base voltage of the first BJT, which occurs due to a temperature change, by using the bias voltage.

20. The regulator circuit of claim 18, wherein the adaptive cascode circuit includes:

a second transistor including a first terminal connected to the gate of the first transistor and a gate to which the start-up voltage is applied.

* * * * *